US012175901B2

(12) United States Patent
Hong et al.

(10) Patent No.: US 12,175,901 B2
(45) Date of Patent: Dec. 24, 2024

(54) DISPLAY DEVICE AND DRIVING METHOD THEREOF

(71) Applicant: LG Display Co., Ltd., Seoul (KR)

(72) Inventors: Mookyoung Hong, Paju-si (KR); Minho Cho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/381,489

(22) Filed: Oct. 18, 2023

(65) Prior Publication Data

US 2024/0221553 A1 Jul. 4, 2024

(30) Foreign Application Priority Data

Dec. 28, 2022 (KR) ........................ 10-2022-0187619

(51) Int. Cl.

| | |
|---|---|
| ***G09G 3/00*** | (2006.01) |
| ***G09G 3/20*** | (2006.01) |
| ***G09G 3/3233*** | (2016.01) |

(52) U.S. Cl.

CPC ........... *G09G 3/006* (2013.01); *G09G 3/2096* (2013.01); *G09G 3/3233* (2013.01); *G09G 2300/0819* (2013.01); *G09G 2300/0842* (2013.01); *G09G 2310/06* (2013.01); *G09G 2320/0233* (2013.01); *G09G 2320/046* (2013.01); *G09G 2330/02* (2013.01); *G09G 2330/08* (2013.01); *G09G 2330/12* (2013.01); *G09G 2370/00* (2013.01)

(58) Field of Classification Search

CPC ....... G09G 2330/028; G09G 2330/021; G09G 3/006; G09G 3/2092

See application file for complete search history.

(56) References Cited

U.S. PATENT DOCUMENTS

| | | | | |
|---|---|---|---|---|
| 2014/0084941 | A1* | 3/2014 | Yun | G09G 3/3233 324/543 |
| 2017/0038427 | A1* | 2/2017 | Kim | G09G 3/00 |
| 2020/0363466 | A1* | 11/2020 | Cheon | H10K 59/131 |

FOREIGN PATENT DOCUMENTS

| | | | |
|---|---|---|---|
| CN | 114822333 | A | 7/2022 |
| KR | 10-2014-0017392 | A | 2/2014 |
| KR | 10-2021-0103013 | A | 8/2021 |
| TW | 201727607 | A | 8/2017 |

* cited by examiner

*Primary Examiner* — Van N Chow

(74) *Attorney, Agent, or Firm* — Birch, Stewart, Kolasch & Birch, LLP

(57) ABSTRACT

A display device can include a display panel having a plurality of sub-pixels, a data driver configured to apply a data signal to the plurality of sub-pixels, a gate driver configured to apply a gate signal to the plurality of sub-pixels, a timing controller configured to output control signals to the data driver and the gate driver, and a power controller configured to detect a defect associated with the display panel, and generate and output a defect signal corresponding on a type of the detected defect. The timing controller stores defect-related information associated with the defect signal.

20 Claims, 14 Drawing Sheets

FIG. 6
Mobility Sensing
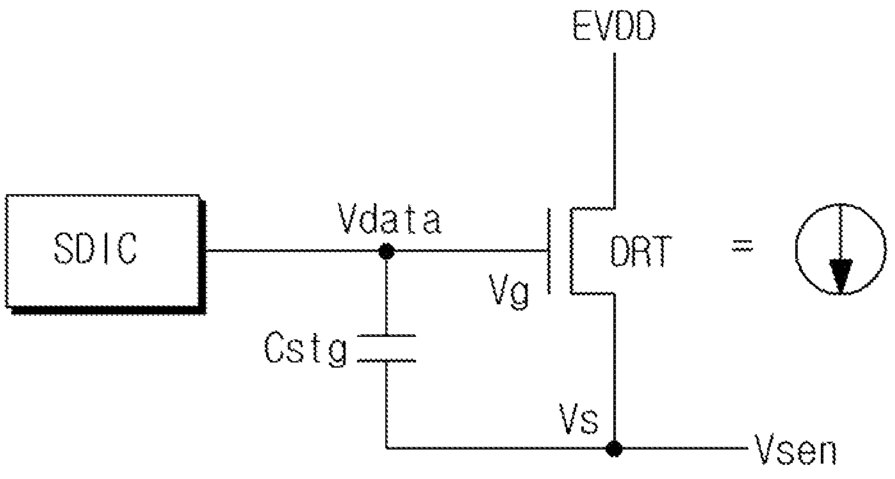
Vsen Wave
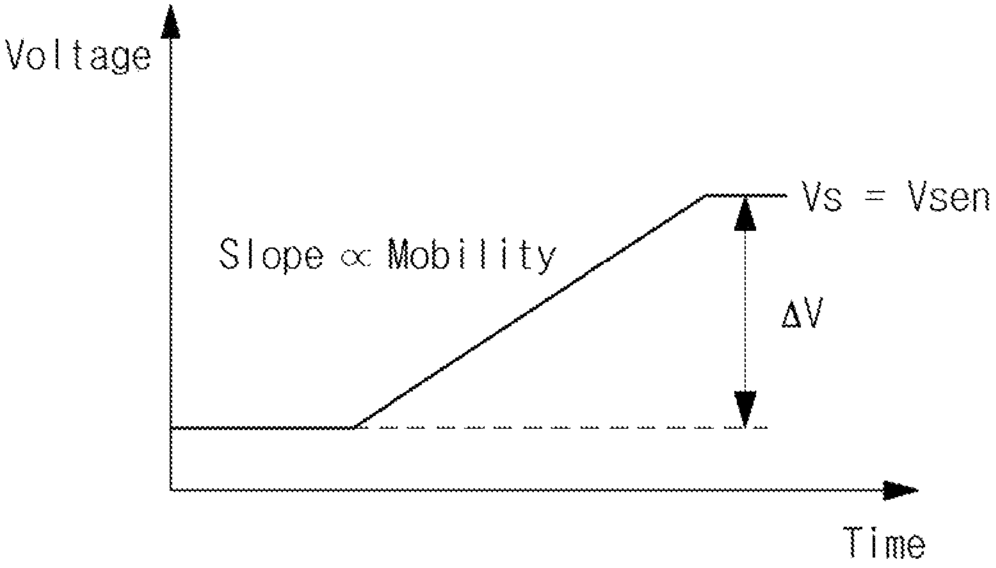

FIG. 13

| signal related to defect | defect cause/type | BDP |
|---|---|---|
| RT BDP | detect LD by analyzing RT sensing data | INBDP(OPEN) |
| EPI Lock BDP | EPI Lock low | INBDP(OPEN) |
| VGH/VGL OCP BDP | occurrence of overcurrent of PMIC output (VGH, VGL) | VGH1 BDP |
| | | VGL1 BDP |
| | | VGL2 BDP |
| | | VGLUD BDP |
| | | VGH2 BDP |
| Power on & OFF-RS BDP | when EVSS voltage is equal to or greater than set level during EVSS floating period (when Power on or off-RS) | Comparator BDP |
| PMIC shutdown BDP | abnormal PMIC shutdown | Shutdown BDP |
| Gamma shutdown BDP | abnormal Gamma block shutdown | P-Gamma BDP |
| L/S IC OCP | Level Shift (GIP) overcurrent occurred | INBDP(OPEN) |
| Edge Crack BDP | Open/short caused by crack at panel edge occurred | INBDP(OPEN) |
| | | INBDP(SHORT) |

DISPLAY DEVICE AND DRIVING METHOD THEREOF

CROSS REFERENCE TO RELATED APPLICATION

The present application claims priority to Korean Patent Application No. 10-2022-0187619, filed on Dec. 28, 2022 in the Republic of Korea, the entire contents of which is hereby expressly incorporated by reference into the present application.

BACKGROUND OF THE INVENTION

Field of the Invention

The present invention relates to a display device and a driving method thereof.

Discussion of the Related Art

Recently, display devices utilizing self-illuminating organic light-emitting diodes (OLEDs) have gained attention due to their advantages such as fast response time, high luminous efficiency, brightness, and wide viewing angles.

These display devices include sub-pixels composed of organic light-emitting diodes (OLEDs) and driving transistors, which are arranged in a matrix format on the display panel and control the brightness of sub-pixels selected through scan signals based on the gradation of the data.

These display devices have various signal lines and signal transmission structures to facilitate their operation.

When defects such as open or short circuits in the signal lines, as well as issues with the connection and bonding of the signal transmission structures, occur, these display devices can experience a panel burnt phenomenon, which can cause abnormal operation and damage to the display panel.

Therefore, there is a strong need to proactively detect any defects that lead to the panel burnt phenomenon before the occurrence of the panel burnt phenomenon.

In addition, there is a need to accurately identify and efficiently manage the detected defects that can cause the panel burnt phenomenon. Through such management, immediate and appropriate measures can be taken in response to the occurrence of defects.

SUMMARY OF THE INVENTION

Embodiments of the present invention provide display devices and driving methods thereof that are capable of preventing a panel burnt phenomenon by efficiently managing any detected defects after the defect has been detected.

Embodiments of the present invention provide display devices and driving methods thereof that are capable of efficiently managing defects by determining the cause (e.g., type) of defects, generating defect signals based on the cause of the defect, and storing the defect signals in a defect management unit.

Embodiments of the present invention provide display devices and driving methods thereof that are capable of allowing for users to easily identify the occurrence timing and the cause of defects.

A display device according to an embodiment of the present invention can include a display panel on which a plurality of sub-pixels are arranged, a data driver configured to apply data voltage to the plurality of sub-pixels, a gate driver configured to apply a gate signal to the plurality of sub-pixels, a power controller configured to detect a defect of the display panel and generate and output a defect signal with a waveform different depending on the type of the detected defect, and a timing controller configured to store information on the defect signal in a memory.

The power controller can generate the defect signal to have different pulse counts depending on the type of defect.

The information on the defect signal can include at least one of the pulse counts, the occurrence timing of the defect signal, and the type of the defect.

The timing controller can identify the type of defect based on the pulse count.

The power controller can detect the defect based on at least one of a sensing value for the display panel, a current value measured in correspondence to a voltage value of the gate signal, shutdown information generated by the power controller, and an internal burnt detection signal input to the power controller.

The power controller can include a detect detection unit configured to detect the defect and output a burnt detection signal different depending on the type of the detected defect and a defect signal generation unit configured to output the defect signal corresponding to the burnt detection signal.

The timing controller can include the memory comprising a non-volatile storage medium and a defect management unit configured to storing the information on the defect signal in the memory.

The power controller can output the defect signal to the timing controller and an external host system.

A driving method of a display device according to an embodiment of the present invention drives the display device including a display panel on which a plurality of sub-pixels are arranged, a data driver applying data voltage to the plurality of sub-pixels, a gate driver applying a gate signal to the plurality of sub-pixels, a power controller applying a driving voltage to the display panel, and a timing controller controlling operations of the data driver and the gate driver.

The method can include detecting, by the power controller, a defect of the display panel, outputting, by the power controller, a defect signal having a waveform different depending on the type of the detected defect, and storing, by the timing controller, information on the defect signal in the memory.

The defect signal can be generated to have different pulse counts depending on the type of the defect.

The information on the defect signal can include at least one of the pulse count, occurrence timing of the defect signal, and type of the defect.

The method can further include identifying, by the timing controller, the type of the defect based on the pulse count.

The detecting of the defect can include detecting the defect based on at least one of a sensing value for the display panel, a current value measured in correspondence to a voltage value of the gate signal, shutdown information generated by the power controller, and an internal burnt detection signal input to the power controller.

The method can further include outputting, by the power controller, the defect signal to an external host system.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 6 is a diagram illustrating a mobility sensing method for a driving transistor of a display device according to an embodiment of the present invention;

FIG. 13 is a diagram illustrating an example of a matching relationship between defect types and burnt detection and protection (BDP) signals in a panel burnt phenomenon prevention system of a display device according to an embodiment of the present invention;

DETAILED DESCRIPTION OF THE EMBODIMENTS

Figure 1:
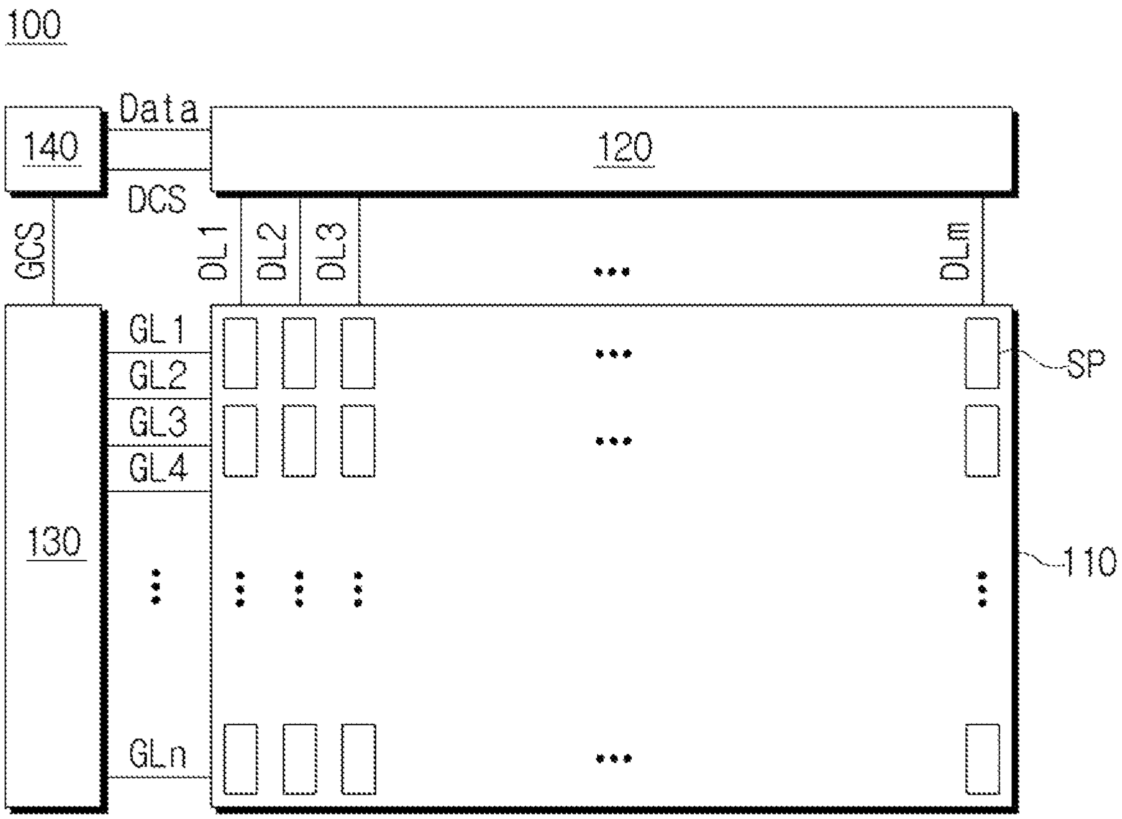
FIG. 1 is a system configuration diagram of a display device according to an embodiment of the present invention.

Hereinafter, embodiments of the present invention will be described with reference to accompanying drawings. In the specification, when a component (or area, layer, part, etc.) is mentioned as being "on top of," "connected to," or "coupled to" another component, it means that it can be directly connected/coupled to the other component, or one or more third components can be placed between them.

The same reference numerals refer to the same components. In addition, in the drawings, the thickness, proportions, and dimensions of the components are exaggerated for effective description of the technical content. The expression "and/of" is taken to include one or more combinations that can be defined by associated components.

The terms "first," "second," etc., are used to describe various components, but the components should not be limited by these terms. The terms are used solely for the purpose of distinguishing one component from another component, and may not define any order or sequence. For example, a first component can be referred to as a second component and, similarly, the second component can be referred to as the first component, without departing from the scope of the present invention. As used herein, the singular forms are intended to include the plural forms as well, unless the context clearly indicates otherwise.

The terms such as "below," "lower," "above," "upper," etc., are used to describe the relationship of components depicted in the drawings. The terms are relative concepts and are described based on the direction indicated on the drawing.

It will be further understood that the terms "comprises," "has," "includes," and the like are intended to specify the presence of stated features, numbers, steps, operations, components, parts, or a combination thereof but are not intended to preclude the presence or possibility of one or more other features, numbers, steps, operations, components, parts, or combinations thereof.

Further, all components of each display device according to all embodiments of the present invention are operatively coupled and configured.

Figure 2:
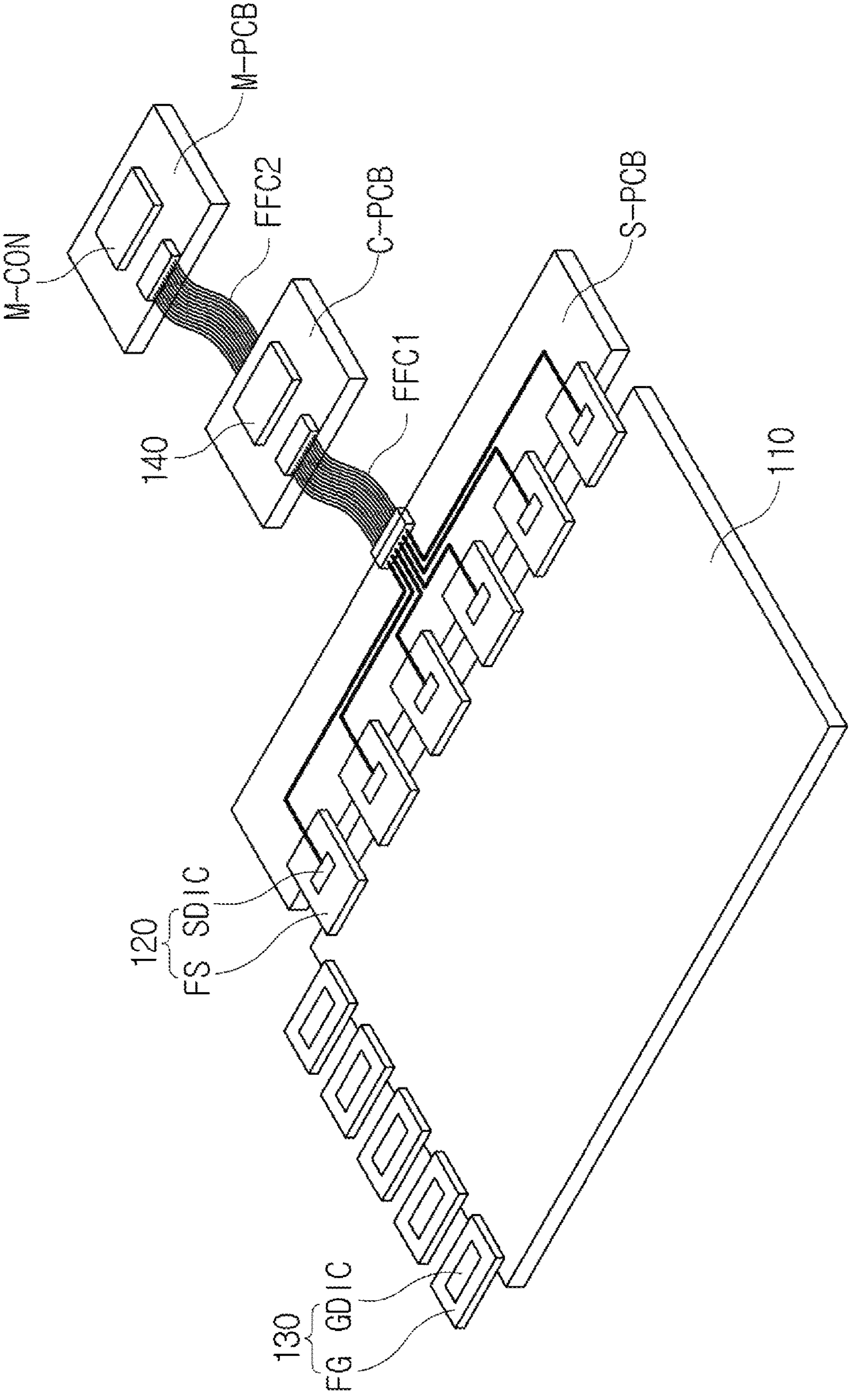
FIG. 2 is a diagram illustrating an example of an implementation of a display device according to an embodiment of the present invention.

FIG. 1 is a system configuration diagram of a display device 100 according to an embodiment of the present invention, and FIG. 2 is a diagram illustrating an example implementation of the display device 100 according to an embodiment of the present invention.

With reference to FIG. 1, the display device 100 according to an embodiment of the present invention includes a display panel 110 in which a plurality of sub-pixels SP defined by a plurality of data lines DL1 to DLm and a plurality of gate lines GL1 to GLn that are arranged thereon in the form of a matrix, a data driver 120 for driving the plurality of data lines DL1 to DLm, a gate driver 130 for driving the plurality of gate lines GL1 to GLn, and a timing controller 140 for controlling the data driver 120 and gate driver 130. Here, each of m and n can be a positive number such as a positive integer.

The timing controller 140 supplies various control signals to the data driver 120 and gate driver 130 to control the data driver 120 and gate driver 130.

The timing controller 140 determines the timing for initiating scanning in each frame, converts the input video data received from external sources into the data signal format used by the data driver 120, outputs the converted video data, and controls the data driving at appropriate times synchronized with the scanning process.

The data driver 120 drives the plurality of data lines DL1 to DLm by supplying data voltages to the plurality of data lines DL1 to DLm. The data driver 120 is also referred to as the "source driver."

The gate driver 130 sequentially supplies scanning signals to the plurality of gate lines GL1 to GLn, thereby sequentially driving the gate lines. The gate driver 130 is also known as the "scan driver."

Under the control of the timing controller 140, the gate driver 130 supplies scanning signals of on or off voltages to the plurality of gate lines GL1 to GLn in a sequential manner.

When a specific gate line is turned on by the gate driver 130, the data driver 120 converts the received video data, which is in digital form, into analog data voltages and supplies the analog data voltages to the plurality of data lines DL1 to DLm.

Although the data driver 120 is located only on one side (e.g., top or bottom) of the display panel 110 in FIG. 1, it can also be positioned on both sides (e.g., top and bottom) of the display panel 110 or can be positioned on a different side of the display panel 110, depending on the driving method and panel design.

Although the gate driver 130 is located on one side (e.g., left or right) of the display panel 110 in FIG. 1, it can also be positioned on both sides (e.g., left and right) of the display panel 110 or can be positioned on a different side of the display panel 110, depending on the driving method and panel design.

The timing controller 140 receives various timing signals including vertical sync signals, horizontal sync signals, input data enable signals, and clock signals, along with the input video data from an external source (e.g., host system).

To control the data driver 120 and gate driver 130, the timing controller 140 generates various control signals based on the timing signals such as vertical sync signals, horizontal sync signals, input data enable (DE) signals, and clock signals, and outputs the generated signals to the data driver 120 and gate driver 130.

For example, the timing controller 140 outputs various gate control signals GCS including a gate start pulse signal, a gate shift clock signal, and a gate output enable signal to control the gate driver 130.

The timing controller 140 also outputs various data control signals DCS including a source start pulse signal, a source sampling clock signal, and a source output enable signal to control the data driver 120.

With reference to FIG. 2, the data driver 120 can include at least one source driver integrated circuit SDIC to drive the plurality of data lines DL1 to DLm.

Each source driver integrated circuit SDIC can be connected to the bonding pads of the display panel 110 using tape-automated-bonding (TAB) or chip-on-glass (COG) techniques or directly placed on the display panel 110 or, in some cases, integrated within the display panel 110, depending on the specific configuration. Further, each source driver integrated circuit SDIC can be implemented using a chip-on-film (COF) method, which is mounted on a source-side film FS connected to the display panel 110, as shown in FIG. 2.

Each source driver integrated circuit SDIC can include components such as a shift register, a latch circuit, a digital-to-analog converter (DAC), and an output buffer.

Each source driver integrated circuit SDIC may, in some cases, include an analog-to-digital converter ADC.

The gate driver 130 can include at least one gate driver integrated circuit GDIC to drive the plurality of gate lines GL1 to GLn. Each gate driver integrated circuit GDIC can be connected to the bonding pad of the display panel 110 using tape-automated bonding (TAB) or chip-on-glass (COG) techniques or directly placed on the display panel 110 by being implemented as a gate-in-panel (GIP) type or, in some cases, integrated within the display panel 110. Furthermore, each gate driver integrated circuit GDIC can be implemented using a chip-on-film (COF) method, where it is mounted on a gate-side film FG connected to the display panel 110, as shown in FIG. 2. Each gate driver integrated circuit GDIC can include components such as a shift register and a level shifter.

In an embodiment of the present invention, the display device 100 can include at least one source printed circuit board S-PCB for the circuit connection of at least one source driver integrated circuit SDIC, and a control printed circuit board C-PCB for mounting control components and various electrical devices. The at least one source printed circuit board S-PCB can accommodate at least one source driver integrated circuit SDIC or can be connected to the source-side film(s) FS where at least one source driver integrated circuit SDIC is mounted.

The control printed circuit board C-PCB can include the timing controller 140 for controlling the operation of the data driver 120 and gate driver 130, and a power controller for supplying various voltages or currents to the display panel 110, data driver 120, and gate driver 130 or controlling the supply of various voltages or currents. The at least one source printed circuit board S-PCB and the control printed circuit board C-PCB can be electrically connected to each other through at least one flexible flat cable FFC1.

The display device 100 can also include a main printed circuit board M-PCB for accommodating a main controller M-CON and other components in addition to the at least one source printed circuit board S-PCB and the control printed circuit board C-PCB. The main printed circuit board M-PCB can be connected to the control printed circuit board C-PCB through at least one flexible flat cable FFC2. The at least one of the source printed circuit board S-PCB, the control printed circuit board C-PCB and the main printed circuit board M-PCB can be integrated into a single printed circuit board.

Each sub-pixel SP arranged on the display panel 110 can be composed of circuit components such as transistors. For example, each sub-pixel SP can include an organic light-emitting diode OLED and a driving transistor to operate the organic light-emitting diode OLED. The types, configurations and quantities of circuit components constituting each sub-pixel SP can vary depending on the desired functions and design approach.

Figure 3:
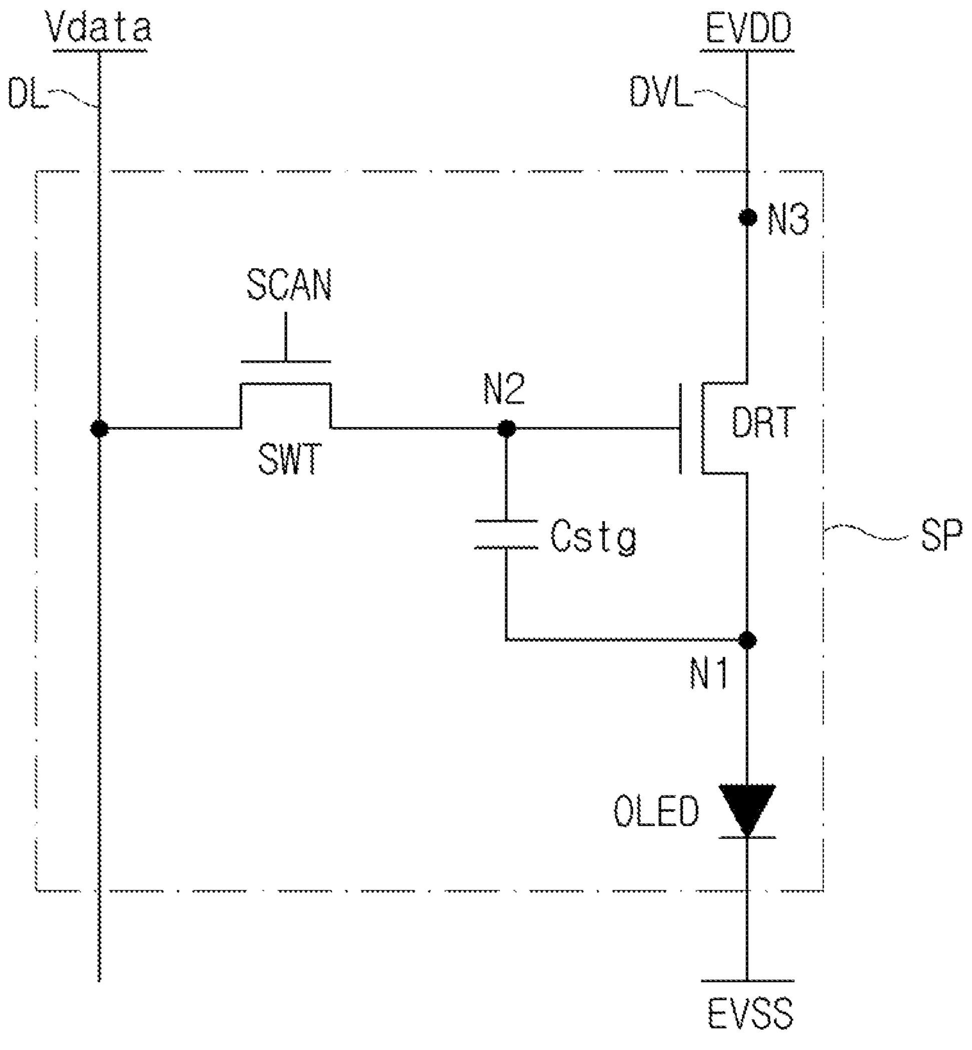
FIG. 3 is a diagram illustrating an example of a sub-pixel configuration of a display device according to an embodiment of the present invention.

FIG. 3 is a diagram illustrating an example of a configuration of a sub-pixel SP of a display device 100 according to an embodiment of the present invention. For instance, the sub-pixel SP's configuration of FIG. 3 can be applied to each sub-pixel SP in the display device of FIGS. 1-2 or in any other display device of the present invention.

With reference to FIG. 3, the sub-pixel of the display device 100 according to an embodiment of the present invention can be configured to include an organic light-emitting diode OLED, a driving transistor DRT that drives the organic light-emitting diode OLED, a switching transistor SWT that transfers a data voltage to the gate node (second node N2) of the driving transistor DRT, and a storage capacitor Cstg that maintains the data voltage corresponding to a video signal voltage or the corresponding voltage for one frame duration.

The organic light-emitting diode OLED can include a first electrode (e.g., anode electrode), an organic layer, and a second electrode (e.g., cathode electrode), but can have other configurations.

The driving transistor DRT drives the organic light-emitting diode OLED by supplying driving current to the organic light-emitting diode OLED. The second node N1 of the driving transistor DRT can be electrically connected to the first electrode of the organic light-emitting diode OLED and can be the source node or the drain node. The second node N2 is electrically connected to the source node or the drain node of the switching transistor SWT and can be the gate node. The third node N3 can be electrically connected to a driving voltage line DVL for supplying a high-potential driving voltage EVDD and can be the drain node or the source node.

The first transistor SWT is electrically connected between the corresponding data line DL and the second node N2 of the driving transistor DRT and is controlled by a scan signal SCAN received through the corresponding gate line and applied at the gate node thereof. The first transistor SWT is turned on by the scan signal SCAN and can transmit the data voltage Vdata supplied through the data line DL to the second node N2 of the driving transistor DRT.

The storage capacitor Cst can be electrically connected between a first node N1 and the second node N2 of the driving transistor DRT. The storage capacitor Cstg can be an external capacitor intentionally designed outside the driving transistor DRT rather than an internal capacitor such as parasitic capacitors (e.g., Cgs and Cgd) existing between the first node N1 and the second node N2 of the driving transistor DRT.

Meanwhile, in the display device 100 according to an embodiment of the present invention, as the driving time of each sub-pixel SP increases, there may be a degradation of circuit components such as the organic light-emitting diodes OLED and driving transistor DRT. As a result, the intrinsic characteristic values of the circuit components can change. These characteristic values can include the threshold voltage and mobility of the driving transistor DRT and the threshold voltage of the organic light-emitting diode OLED. Such changes in the characteristic values of the circuit components can lead to variations in the luminance of the corresponding sub-pixels, which can cause a decrease in the uniformity of brightness in the display panel 110 and a deterioration of image quality.

To address this issue, the display device 100 according to an embodiment of the present invention can provide sensing functionality to sense the characteristic values or changes in the characteristic values of the circuit components and compensation functionality to compensate for the characteristic value deviations between circuit components based on the sensing results. This configuration will now be discussed referring to FIG. 4.

Figure 4:
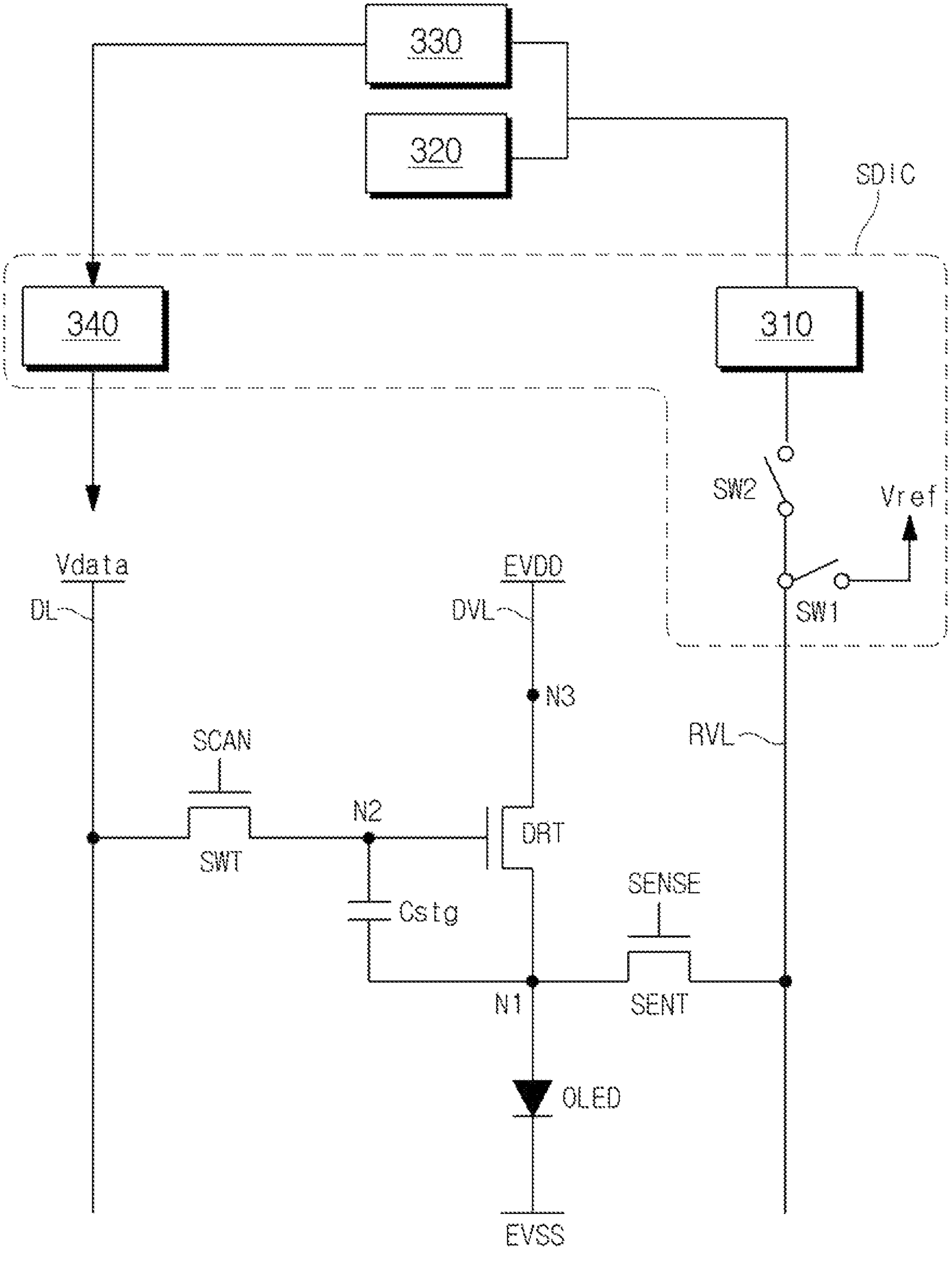
FIG. 4 is a diagram illustrating an example of a sub-pixel configuration and compensation circuitry of a display device according to another embodiment of the present invention.

FIG. 4 is a diagram illustrating an example of a sub-pixel configuration and compensation circuitry of the display device 100 according to another embodiment of the present invention. As an example, the sub-pixel configuration of FIG. 4 can be applied to each sub-pixel SP in any display device of the present invention.

With reference to FIG. 4, each sub-pixel arranged in the display panel 110 according to this embodiment of the present invention can include a sensing transistor SENT in addition to the organic light-emitting diode OLED, the driving transistor, DRT, the switching transistor SWT, and the storage capacitor Cstg.

The sensing transistor SENT can be electrically connected between the first node N1 of the driving transistor DRT and a reference voltage line RVL supplying a reference voltage Vref and can be controlled by a sensing signal SENSE as a type of scan signal applied to the gate node thereof. The sensing transistor SENT turns on in response to the sensing signal SENSE and applies the reference voltage Vref supplied through the readout line (reference voltage line) RVL to the first node N1 of the driving transistor DRT. The sensing transistor SENT can also serve as one of the voltage sensing paths for the first node N1 of the driving transistor DRT.

In an embodiment of the present invention, the scan signal SCAN and the sensing signal SENSE can be separate gate signals. In this case, the scan signal SCAN and the sensing signal SENSE can be applied to the gate nodes of the switching transistor SWT and the sensing transistor SENT, respectively, through different gate lines. In another embodiment of the present invention, the scan signal SCAN and the sensing signal SENSE can be the same gate signal. In this case, the scan signal SCAN and the sensing signal SENSE can be commonly applied to the gate nodes of both the switching transistor SWT and the sensing transistor SENT through the same gate line.

The driving transistor DRT, the switching transistor SWT, and the sensing transistor SENT can each be implemented as an n-type or p-type transistor.

With reference to FIG. 4, the display device 100 according to an embodiment of the present invention can further include a sensing unit 310 for measuring voltages to sense sub-pixel characteristic values (e.g., characteristic values of the driving transistor DRT and organic light-emitting diode OLED) or changes in the characteristic values and outputting sensing data including sensing values obtained by converting the measured voltages to digital values, a memory (or storage unit) 320 for storing the sensing data, and a compensation unit 330 for performing compensation processes to analyze the sub-pixel characteristic values or changes in the sub-pixel characteristic values based on the sensing data and compensate for any characteristic value deviation between sub-pixels.

The sensing unit 310 can be configured to include at least one analog-to-digital converter (ADC). The at least one analog-to-digital converter (ADC) can be included within the source driver integrated circuit SDIC or positioned outside the source driver integrated circuit SDIC, depending on the case or configuration. The sensing data output from the sensing unit 310 can have a low voltage differential signaling (LVDS) data format as an example.

The compensation unit 330 can be included internally or externally to the timing controller 140 depending on the case or configuration.

In an embodiment of the present invention, the display device 100 (e.g., the SDIC) can include a first switch SW1 that controls the supply of the reference voltage Vref to the reference voltage line RVL for controlling the sensing operation, and a second switch SW2 that switches the connection between the reference voltage line RVL and the sensing unit 310.

When the first switch SW1 is turned on, the reference voltage Vref is supplied to the reference voltage line RVL. The reference voltage Vref supplied to the reference voltage line RVL can be applied to the first node N1 of the driving transistor DRT through the turned-on sensing transistor SENT.

Furthermore, when the voltage at the first node N1 of the driving transistor DRT reaches a voltage state reflecting the sub-pixel characteristics, the voltage on the reference voltage line RVL can also be in a voltage state reflecting the sub-pixel characteristics. In this case, the voltage reflecting the sub-pixel characteristics can be charged to the line capacitor formed on the reference voltage line RVL. In other words, when the sensing transistor SENT is turned on, the voltage at the first node N1 of the driving transistor DRT can be the same as the voltage charged to the line capacitor formed on the reference voltage line RVL.

When the voltage at the first node N1 of the driving transistor DRT reaches a voltage state reflecting the sub-pixel characteristics, the second switch SW2 can be turned on, allowing the sensing unit 310 to be connected to the reference voltage line RVL. Accordingly, the sensing unit 310 can sense the voltage of the reference voltage line RVL in the voltage state reflecting the sub-pixel characteristics. In the regard, the reference voltage line RVL is also referred to as a "sensing line." That is, the sensing unit 310 senses the voltage at the first node N1 of the driving transistor DRT.

This reference voltage line RVL, for example, can be per sub-pixel column or per two or more sub-pixel columns. For instance, in the case where one pixel is composed of four sub-pixels (e.g., red sub-pixel, white sub-pixel, green sub-pixel, blue sub-pixel), the reference voltage line RVL can be arranged with one line per pixel column containing four sub-pixel columns (e.g., red sub-pixel column, white sub-pixel column, green sub-pixel column, blue sub-pixel column).

In the case of sensing the threshold voltage of the driving transistor DRT, the voltage sensed by the sensing unit 310 can be a voltage value (Vdata-Vth or Vdata-ΔVth) including the threshold voltage (Vth) or threshold voltage variation (ΔVth) of the driving transistor DRT. Meanwhile, in the case of sensing the mobility of the driving transistor DRT, the voltage sensed by the sensing unit 310 can be a voltage value representing the mobility of the driving transistor DRT.

Hereinafter, descriptions are briefly made of the threshold voltage sensing operation and mobility sensing operation for the driving transistor DRT (e.g., of FIG. 4) according to an embodiment of the present invention.

Figure 5:
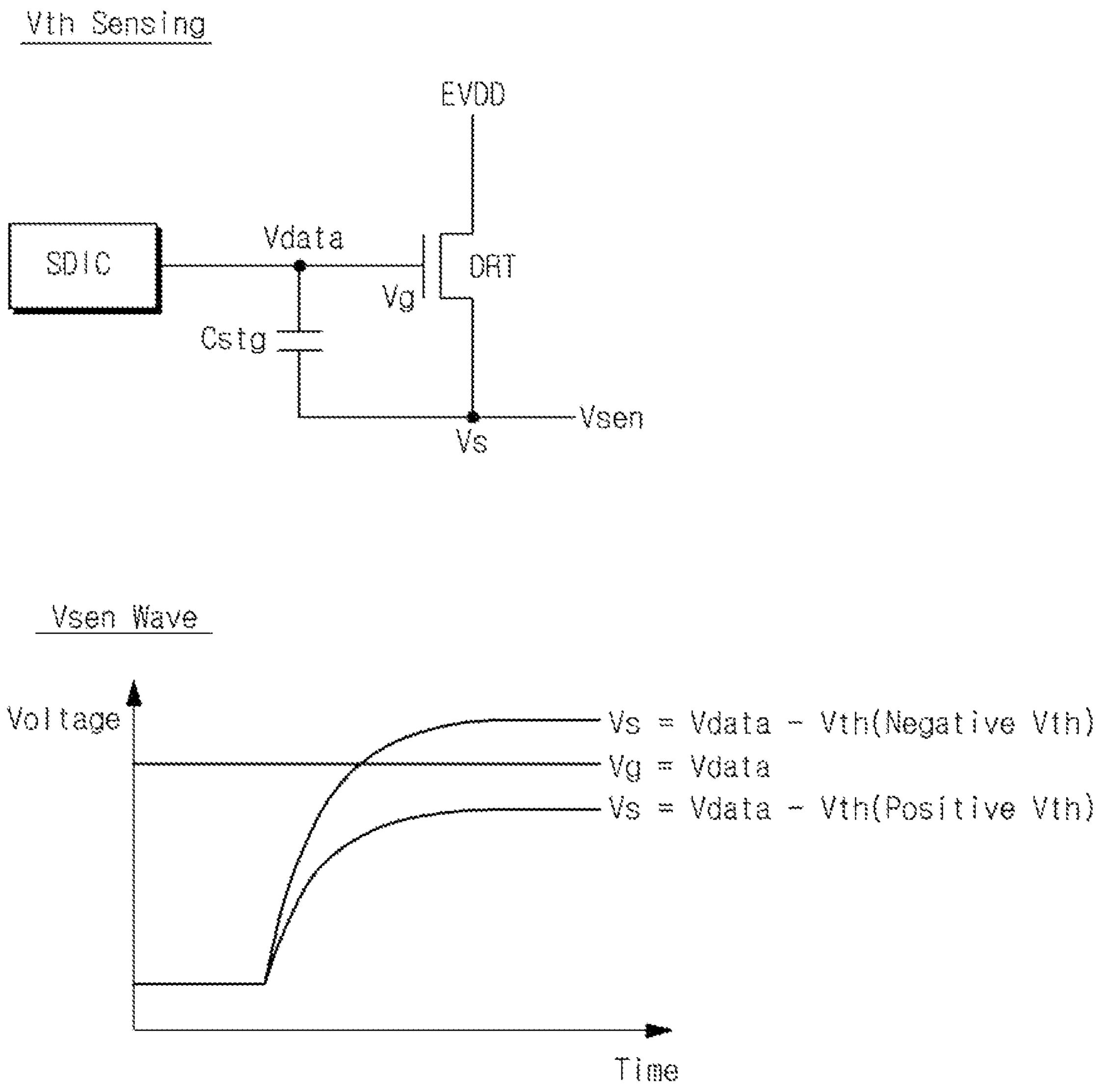
FIG. 5 is a diagram illustrating a threshold voltage sensing method for a driving transistor of a display device according to an embodiment of the present invention.

In this regard, FIG. 5 is a diagram for explaining a threshold voltage sensing method for a driving transistor of a display device 100 according to an embodiment of the present invention.

Referring to FIG. 5, when the threshold voltage sensing operation is initiated for the driving transistor DRT, the first node N1 and the second node N2 of the driving transistor DRT are initialized respectively with the reference voltage Vref and the data voltage Vdata for threshold voltage sensing. Subsequently, when the first switch SW1 (e.g., in FIG. 4) is turned off, the first node N1 of the driving transistor DRT becomes floating. As a result, the voltage at the first node N1 of the driving transistor DRT increases.

The voltage at the first node N1 of the driving transistor DRT increases until it saturates, gradually reducing the magnitude of the voltage increase. The saturated voltage at the first node N1 of the driving transistor DRT can correspond to the difference between the data voltage Vdata and the threshold voltage Vth or the difference between the data voltage Vdata and the threshold voltage variation ΔVth.

Once the voltage at the first node N1 of the driving transistor DRT saturates, the saturated voltage is sensed by the sensing unit 310.

The sensed voltage Vsen by the sensing unit 310 can be the voltage obtained by subtracting the threshold voltage Vth from the data voltage Vdata (Vdata-Vth) or the voltage obtained by subtracting the threshold voltage variation ΔVth from the data voltage Vdata (Vdata-ΔVth).

FIG. 6 is a diagram illustrating a mobility sensing method for a driving transistor of a display device 100 according to an embodiment of the present invention.

Referring to FIG. 6, when the mobility sensing operation is initiated, the first node N1 and the second node N2 of the driving transistor DRT (e.g., in FIG. 4) are respectively initialized with the reference voltage Vref and the data voltage Vdata for mobility sensing.

Subsequently, the first switch SW1 is turned off, causing the first node N1 of the driving transistor DRT to float. In this case, the switching transistor SWT can be turned off, allowing the second node N2 of the driving transistor DRT to also float. As a result, the voltage at the first node N1 of the driving transistor DRT begins to rise. The rate of voltage rises during a specific period of time at the first node N1 of the driving transistor DRT, which is indicated by the voltage rise magnitude ΔV, depends on current-carrying capacity, i.e., mobility, of the driving transistor DRT. For example, a driving transistor DRT with higher current-carrying capacity (mobility) will exhibit a steeper voltage rise at the first node N1, resulting in a larger voltage rise magnitude ΔV during the specified time period.

After the voltage at the first node N1 of the driving transistor DRT has risen for the predetermined time duration, the sensing unit 310 senses the elevated voltage at the first node N1 (i.e., the voltage on the reference voltage line RVL increased along with the voltage rise at the first node N1 of the driving transistor DRT).

Based on the threshold voltage and/or mobility sensing operation as described above, the sensing unit 310 converts the sensed voltage Vsen into a digital value and generates and outputs sensing data including the converted digital value (sensing value). The sensing data outputted from the sensing unit 310 can be stored in the memory 320 or provided to the compensation unit 330.

The compensation unit 330 can determine the characteristic values (e.g., threshold voltage and mobility) of the driving transistor DRT within the corresponding sub-pixel or changes in the characteristic values based on the sensing data stored in the memory 320 or provided by the sensing unit 310 and perform a characteristic value compensation process.

Here, the changes in the characteristic values of the driving transistor DRT can refer to the change in the current sensing data compared to the previous sensing data, or the change in the current sensing data compared to the reference compensation data.

By comparing the characteristic values or changes in the characteristic values between driving transistors DRT, the compensation unit 330 can determine the deviations in characteristic values among the driving transistors DRT. When the changes in characteristic values of the driving transistor DRT refer to the change in the current sensing data compared to the reference sensing data, it is possible to determine the deviations in characteristic values (i.e., sub-pixel luminance deviations) among the driving transistors DRT based on the changes in the characteristic values of the driving transistors DRT.

The characteristic value compensation process can include a threshold voltage compensation process for compensating the threshold voltage of the driving transistor DRT and a mobility compensation process for compensating the mobility of the driving transistor DRT.

The threshold voltage compensation process involves calculating compensation values for the threshold voltage or threshold voltage deviation (threshold voltage variation) and storing the calculated compensation values in the memory 320 or modifying the corresponding video data Data using the computed compensation values.

The mobility compensation process involves calculating compensation values for the mobility or threshold mobility deviation (mobility variation) and storing the calculated compensation values in the memory 320 or modifying the corresponding video data Data using the computed compensation values.

The compensation unit 330 can modify the video data Data through the threshold voltage compensation or mobility compensation and supply the modified data to the corresponding source driver integrated circuit SDIC within the data driver 120. Consequently, the source driver integrated circuit SDIC converts the data modified by the compensation unit 330 into a data voltage via a digital-to-analog converter (DAC) 340 and supplies the data voltage to the corresponding sub-pixel, allowing for actual compensation of sub-pixel characteristic values (e.g., threshold voltage compensation and/or mobility compensation). The sub-pixel characteristic value compensation helps reduce or prevent luminance deviations among the sub-pixels, leading to an improvement in the uniformity of luminance across the display panel 110 and the overall image quality.

Figure 7:
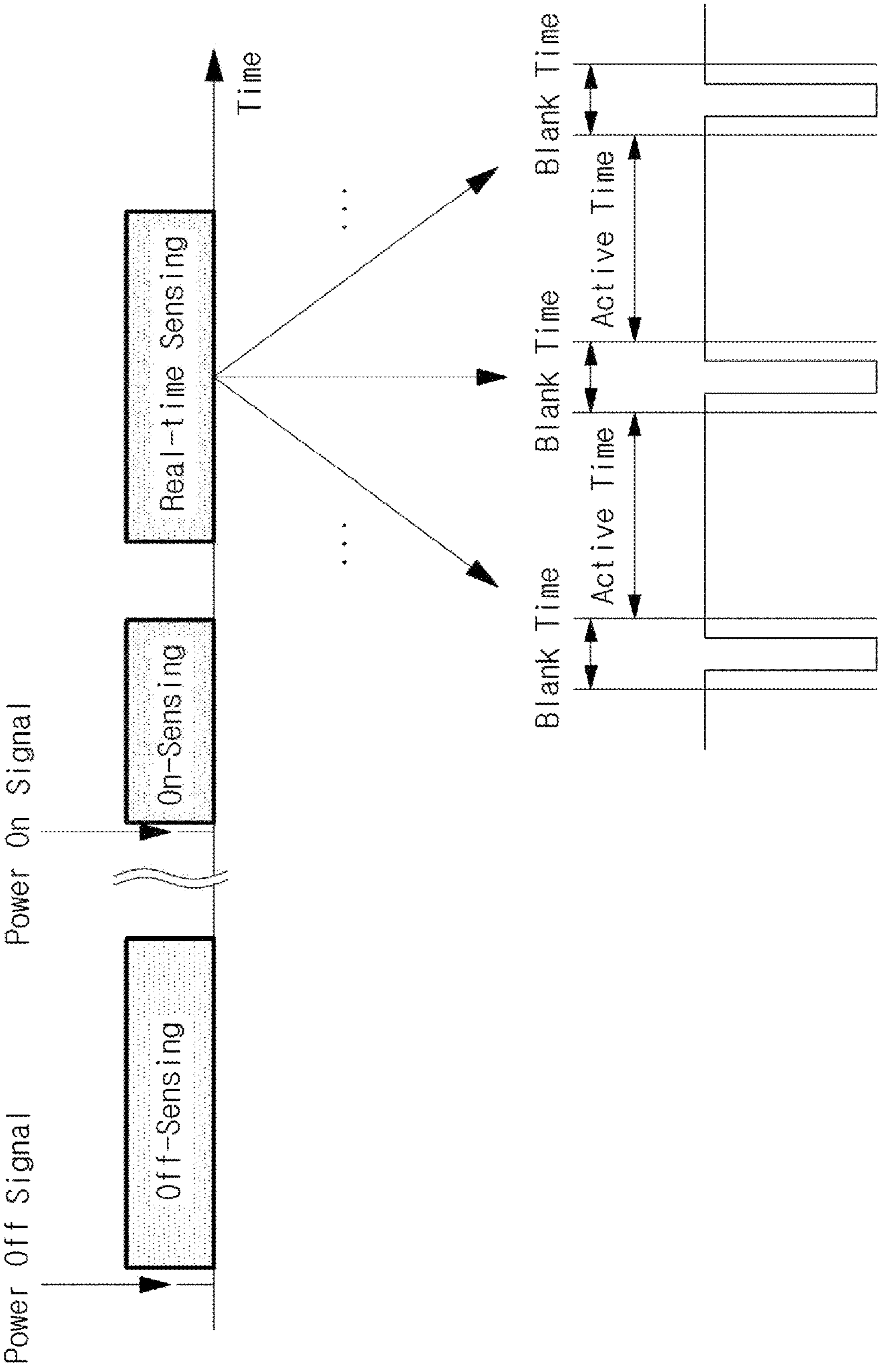
FIG. 7 is a diagram illustrating sensing timing of a display device according to an embodiment of the present invention.

FIG. 7 is a diagram illustrating an example of a sensing timing of a display device 100 according to an embodiment of the present invention.

With reference to FIG. 7, the display device 100 can perform sensing of the characteristic values of circuit components within each sub-pixel of the display panel 110 upon detection of a power-off signal generated in response to a user input or the like. This sensing process that occurs after the power-off signal is generated can be called "off-sensing."

Meanwhile, the display device 100 according to an embodiment of the present invention can perform sensing of the characteristic values of circuit components within each sub-pixel upon detection of a power-on signal but before the display driving begins. This sensing process that occurs after the power-on signal is generated before the display driving can be called "on-sensing."

Furthermore, the display device 100 according to an embodiment of the present invention can perform sensing of the characteristic values of circuit components within each sub-pixel during the display driving (e.g., when the display panel is driven to display images). This sensing process that occurs during the display driving is referred to as "real-time sensing" or "RT sensing." The real-time sensing takes place at each blank time between active times, which is determined by the vertical sync signal.

Meanwhile, when one or more of the signal lines (DL, RVL, GL, and DVL) arranged on the display panel 110 are open or when two or more signal lines are shorted, the sensing values can be obtained abnormally. Accordingly, when the difference between the sensing values obtained through the sensing process described above and the reference sensing values (sensing value obtained when the signal lines are in a normal state) exceeds a predetermined range, it is possible to determine that there is a defect on the signal lines.

Figure 8:
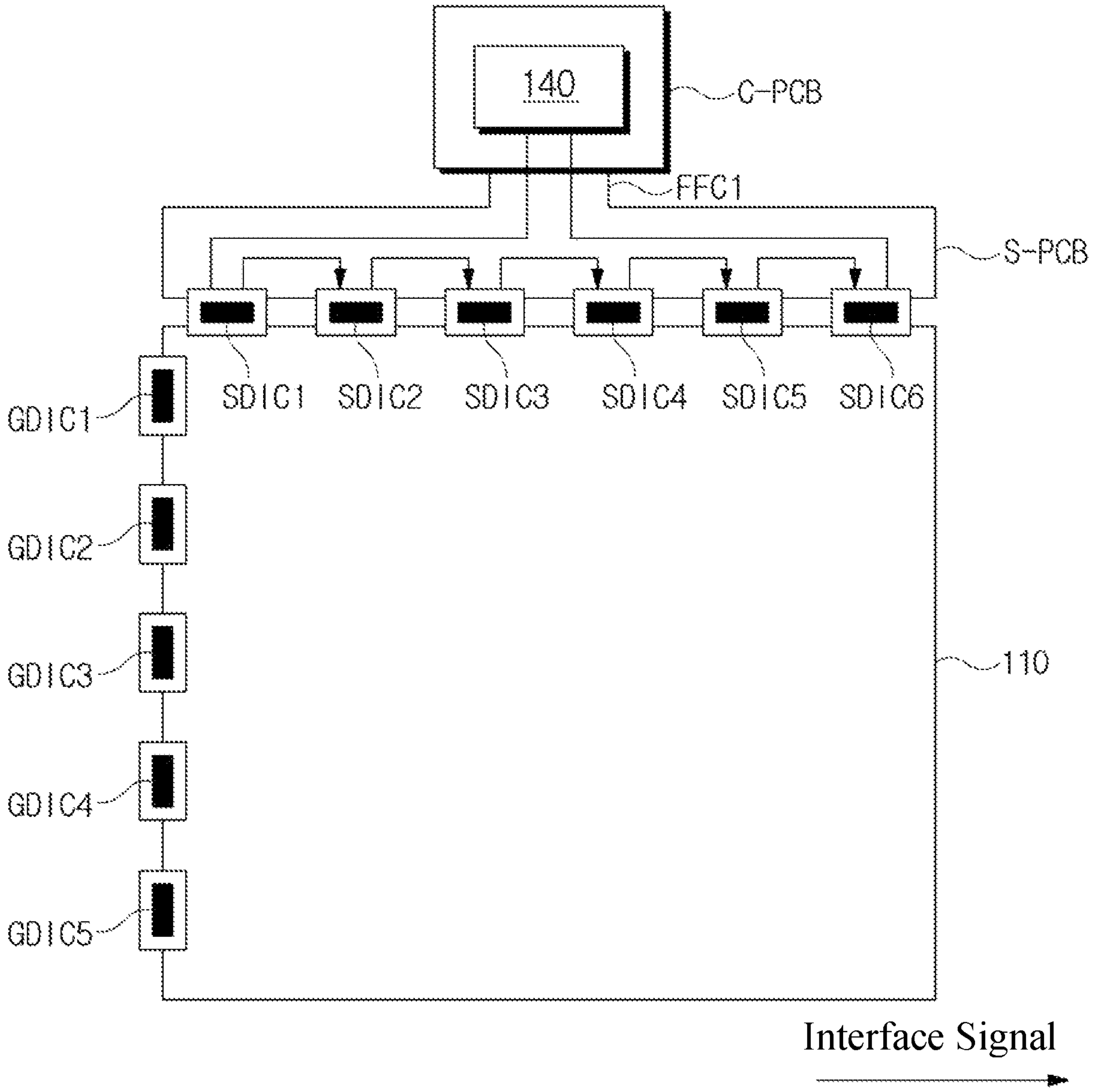
FIG. 8 is a diagram illustrating a state check process using an interface signal between a timing controller and source drive integrated circuits in a display device according to an embodiment of the present invention.

FIG. 8 is a diagram illustrating a state check process using an interface signal between a timing controller 140 and source drive integrated circuits SDIC1 to SDIC6 in a display device according to an embodiment of the present invention. For the convenience of the explanation, in this example, it is assumed that the data driver 120 includes six source driver integrated circuits SDIC1 to SDIC6.

According to this embodiment of the present invention, the display device 100 includes interfaces such as an enhanced parallel interface (EPI) and low-voltage differential signaling LVDS interface between the timing controller 140 and the six source driver integrated circuits SDIC1 to SDIC6 to facilitate the transmission of signals such as video data, sensing data, and various control signals.

With reference to FIG. 8, the timing controller 140 transmits an interface signal through the interface to the outermost source driver integrated circuit SDIC1 among the six source driver integrated circuits SDIC1 to SDIC6 to determine whether each of the six source driver integrated circuits SDIC1 to SDIC6 is in a normal state for performing data driving.

The first source driver integrated circuit SDIC1 can transmit one of a high-level interface signal indicative of its normality and a low-level interface signal indicative of its abnormality to the next SDIC2.

When receiving a low-level interface signal from the first source driver integrated circuit SDIC1, the second source driver integrated circuit SDIC2 can forward the low-level interface signal to the third source driver integrated circuit SDIC3, regardless of its own state. On the other hand, when receiving a high-level interface signal from the first source driver integrated circuit SDIC1, the second source driver integrated circuit SDIC2 can transmit one of a high-level interface signal indicative of its own normality and a low-level interface signal indicative of its own abnormality to the third source driver integrated circuit SDIC3. For instance, when the high-level interface signal (normal state) is received from the first source driver integrated circuit SDIC1, the second source driver integrated circuit SDIC2 does not forward the received high-level interface signal, but generates its own high-level interface signal or low-level interface signal indicating the normal/abnormal state of the second source driver integrated circuit SDIC2 and transmits that signal to the third source driver integrated circuit SDIC3. This process is continued in the subsequent source driver integrated circuits SDIC3, SDIC4, SDIC5, etc.

According to the above-described interface transmission method, when all six source driver integrated circuits SDIC1 to SDIC6 are in a normal state, the outermost sixth source driver integrated circuit SDIC6 on the other side can output a high-level interface signal to the timing controller 140. If the high-level interface signal from the sixth source driver integrated circuit SDIC6 is received, the timing controller 140 recognizes it to mean that all six source driver integrated circuits SDIC1 to SDIC6 are in normal states and are capable of performing data driving properly.

According to the above-described interface transmission method, when any of the six source driver integrated circuits SDIC1 to SDIC6 is in an abnormal state, the outermost sixth source driver integrated circuit SDIC6 on the other side can output a low-level interface signal to the timing controller 140. When such a signal is received, the timing controller 140 recognizes it to mean that at least one of the six source driver integrated circuits SDIC1 to SDIC6 is in an abnormal state and is unable to perform data driving properly. As a variation, when one of the five source driver integrated circuits SDIC1 to SDIC5 is in an abnormal state and generates a low-level interface signal, then the next one among the six source driver integrated circuits SDIC1 to SDIC6 can stop its own normal/abnormal checking and can merely pass the received low-level interface signal to the next source driver integrated circuit and so on, so that at the end, the sixth source driver integrated circuit SDIC6 basically forwards the received low-level interface signal to the timing controller 140.

Furthermore, the timing controller 140 can receive a low-level interface signal from the sixth source driver integrated circuit SDIC6, not only when at least one of the six source driver integrated circuits SDIC1 to SDIC6 is in an abnormal state but also when the connectivity of the flexible flat cable FFC1 between the source printed circuit board S-PCB and the control printed circuit board C-PCB is faulty or has an issue.

In the present specification, the interface signal (e.g., high-level or low-level interface signal discussed above) can be, for example, a lock signal.

Figure 9:
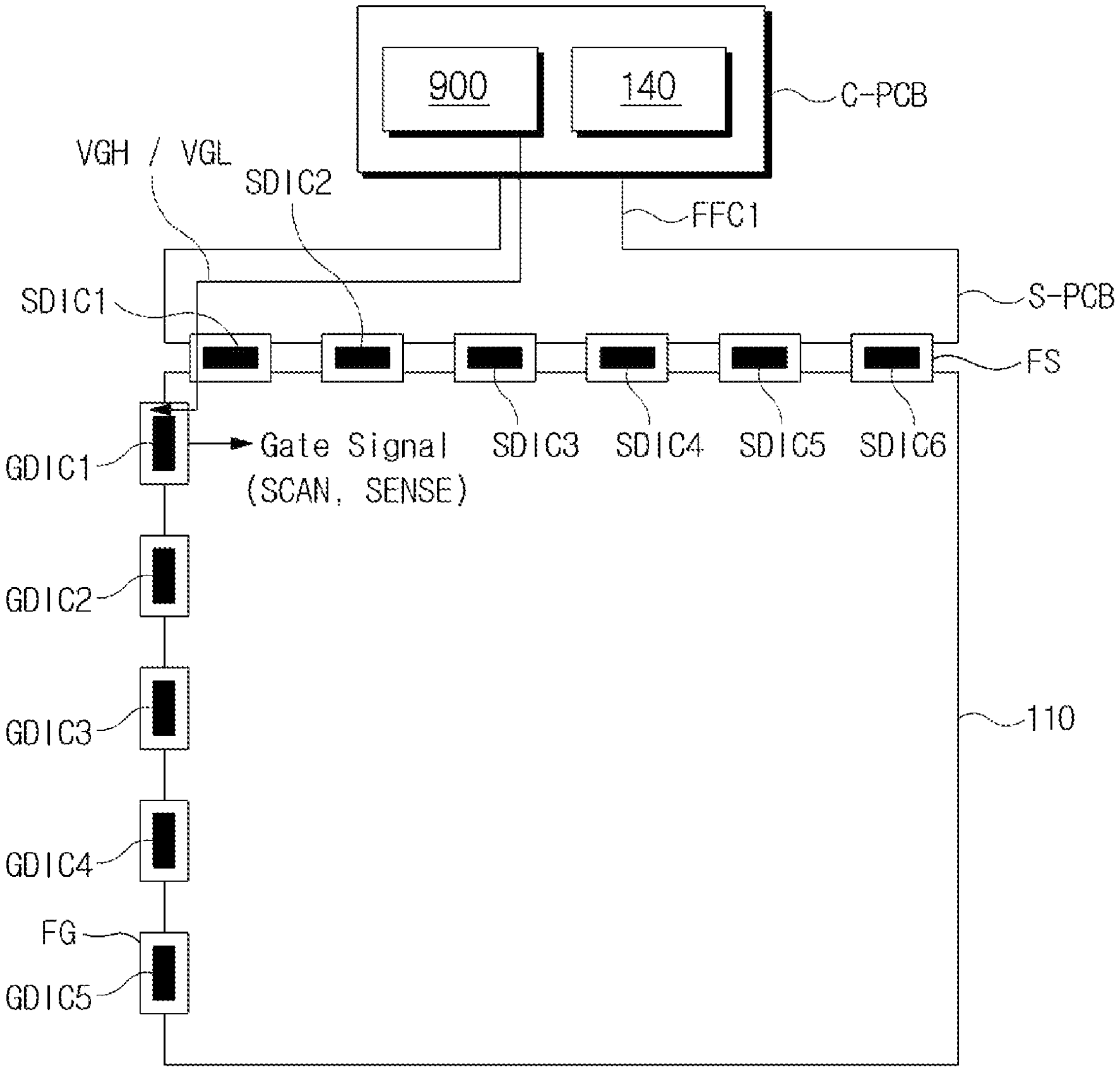
FIG. 9 is a diagram illustrating an example of a gate voltage transmission in a display device according to an embodiment of the present invention.

FIG. 9 is a diagram illustrating an example of a gate voltage transmission in a display device 100 according to an embodiment of the present invention. For convenience of the explanation, as an example, it is assumed that the gate driver 130 includes five gate integrated circuits GDIC1 to GDIC5, but other variations are possible.

With reference to FIG. 9, the power controller 900 located on the control printed circuit board C-PCB outputs the gate voltages VGH and VGL needed for gate driving. The gate voltages VGH and VGL outputted from the power controller 900 enter the display panel 110 via the control printed circuit board C-PCB, the source printed circuit board S-PCB, and the source-side film FS on which the source driver integrated circuits SDICs are mounted. The gate voltages VGH and VGL entering the display panel 110 are then delivered to the five gate integrated circuits GDIC1 to GDIC5 through gate voltage lines on the display panel 110.

Each of the five gate integrated circuits, GDIC1 to GDIC5 generates and outputs gate signals SCAN and SENSE based on the received gate voltages VGH and VGL. However, when there is an abnormality in the gate voltages VGH and VGL, each of the five gate integrated circuits GDIC1 to GDIC5 may not be able to perform normal gate driving.

Therefore, in an embodiment of the present invention, the display device 100 can determine the presence of abnormalities in the gate voltages VGH and VGL that are entering the display panel 110. For example, the display device 100 according to an embodiment of the present invention can utilize circuits such as comparators to sense the current corresponding to the gate voltages VGH and VGL when they actually enter the display panel 110 and compare the sensed current with a reference current corresponding to the normal current, in order to determine whether or not the current corresponding to the gate voltages VGH and VGL that are actually entering the display panel 110 is abnormal (e.g., overcurrent).

When it is detected that the current corresponding to the gate voltages VGH and VGL is determined to be abnormal, it can mean a presence of a defect in at least one of the gate voltage lines on the display panel 110, the gate-side film FG, the source-side film FS, the source printed circuit board S-PCB, the flexible flat cable FFC1, or the control printed circuit board C-PCB.

Figure 10:
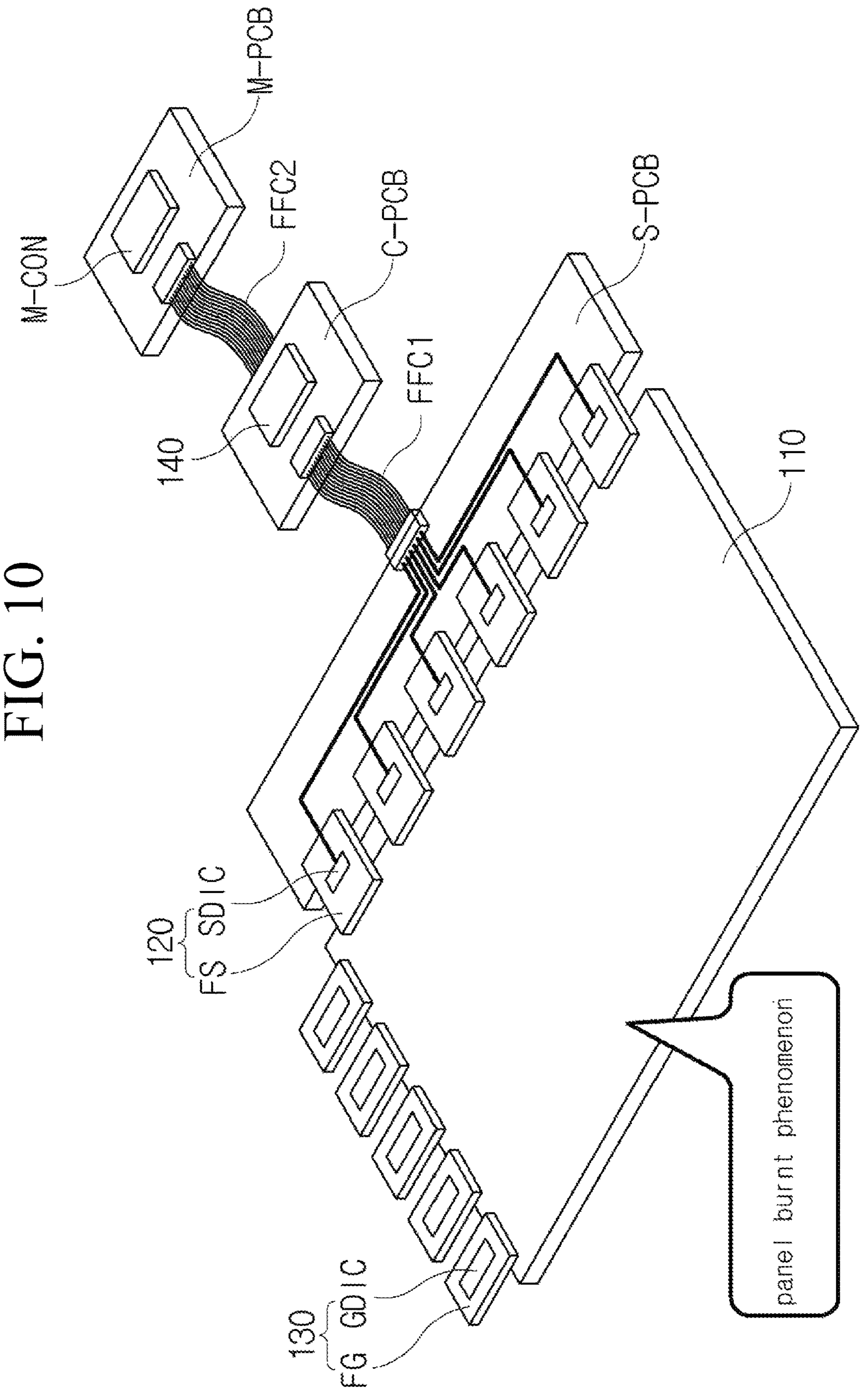
FIG. 10 is a diagram for explaining a panel burnt phenomenon in a display device according to an embodiment of the present invention.

FIG. 10 is a diagram for explaining a panel burnt phenomenon in a display device 100 according to an embodiment of the present invention.

With reference to FIG. 10, the display panel 110 of the display device 100 can experience panel burnt phenomena that can be caused by various types of defects. The panel burnt phenomenon can occur due to various defects, which can include but are not limited to, short or open circuits in the signal lines, DL, GL, DVL, RVL, gate voltage wiring, etc., located on the display panel 110, bonding errors between the display panel 110 and the gate-side film FG or source-side film FS, a loose connection of the flexible flat cable FFC1 causing electrical connection issues between the source printed circuit board S-PCB and the control printed circuit board C-PCB, a loose connection of the flexible flat cable FFC2 causing electrical connection issues between the control printed circuit board C-PCB and the main printed circuit board M-PCB, etc.

In the presence of such defects, the display panel 110 can experience a panel burnt phenomenon and may not function properly. Moreover, the display device 100 can malfunction and, in very extreme cases, can even lead to fire incidents.

Therefore, it is needed to proactively detect and manage the defects that lead to the panel burnt phenomenon, so that the panel burnt phenomenon does not occur. Moreover, efficient management of potential defects that could result in a panel burnt phenomenon is also needed. This facilitates prompt and suitable response measures in the event of such a defect occurrence.

The display device 100 according to an embodiment of the present invention can incorporate a method for managing defects efficiently by generating, upon detection of a defect, a burnt detection and protection signal BDP corresponding to the type (e.g., cause) of the defect.

Hereinafter, a method and system for preventing a panel burnt phenomenon according to one or more embodiments of the present invention is described in detail.

Figure 11:
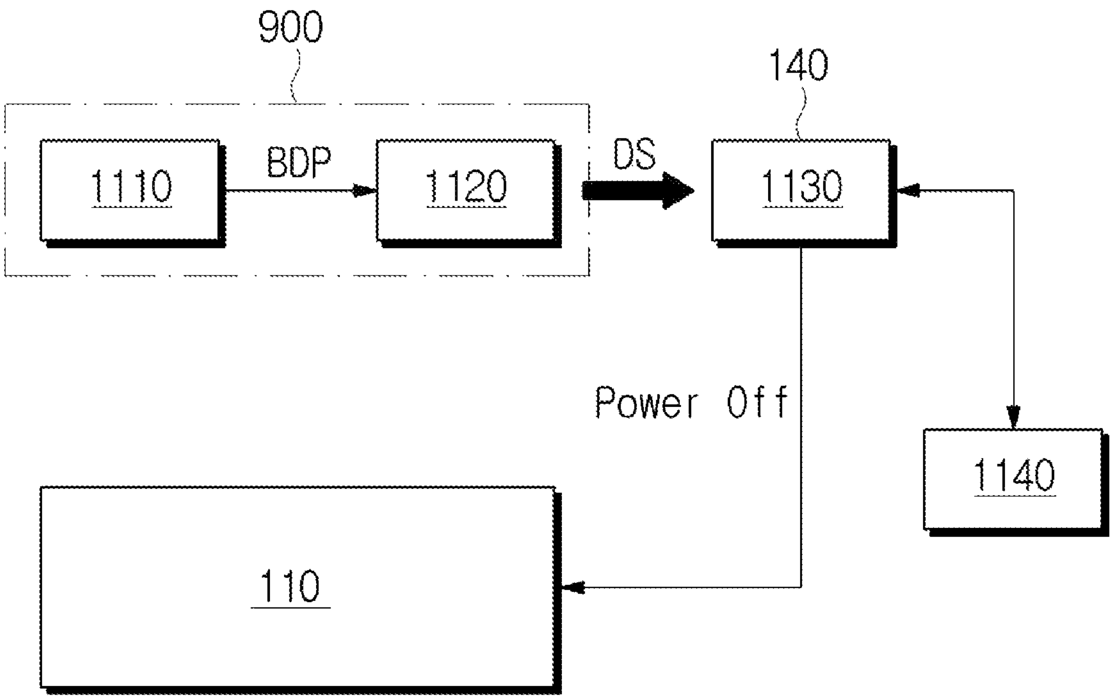
FIG. 11 is a diagram illustrating a system for preventing a panel burnt phenomenon in a display device according to an embodiment of the present invention.

Particularly, FIG. 11 is a diagram illustrating an example of a system for preventing a panel burnt phenomenon in a display device 100 according to an embodiment of the present invention.

With reference to FIG. 11, the panel burn prevention system in the display device 100 includes a defect detection unit 1110, a defect signal generation unit 1120, and a defect management unit 1130. In an embodiment of the present invention, the defect detection unit 1110 and the defect signal generation unit 1120 can be integrated within or can be provided in the power controller 900. The defect management unit 1130 can be included in the timing controller 140.

The defect detection unit 1110 detects defects in the display device 100. For example, the defect detection unit 1110 can detect defects in the signal lines inside or outside the display panel 110 or defects related to the malfunction of the display panel 110. Furthermore, the defect detection unit 1110 generates and outputs burnt detection and protection signals BDPs corresponding to the type of detected defects. In an embodiment of the present invention, the defect detection unit 1110 can output the BDP signal to an external host system (e.g., an external device communicating with the display device or the power controller 900), e.g., wirelessly.

Specifically, the defect signal generation unit 1120 generates and transmits defect signals DS with different signal waveforms corresponding to the detected defects (e.g., types of defects). Here, the different signal waveforms can be, for example, waveforms with varying pulse counts (e.g., rising edge count, high/low-level interval count, etc.).

The defect management unit 1130 can store and manage information related to the defect signals DS. The information on the defect signal DS can include the occurrence time of each defect signal DS (e.g., indicative of when a defect is generated or detected) and the waveform of each defect signal DS (e.g., indicative of a specific type of defect). In an embodiment of the present invention, the defect management unit 1130 receives the defect signal DS, analyzes the waveform of the received defect signal DS to determine or recognize the type of defect, and stores the determined result in the memory 1140 for management. The memory 1140 can be a non-volatile storage medium that retains data even when the power of the display device is turned off, and it can be implemented as, e.g., a negative and direct (NAND) memory. However, the memory 1140 is not limited thereto and can be of a different type.

By using the above-described panel burn prevention system, users of the display device 100 or another apparatus/system capable of communicating with the display device 100 can identify the occurrence timing, cause, and location of defects based on the stored information or the determined result from the defect management unit 1130. This allows for appropriate measures to be taken in response to detected defects, according to the type of the defect detected.

In one embodiment, the defect management unit 1130 can perform power-off processing based on the recognized defect type. For example, the defect management unit 1130 can perform power-off processing for the drive voltage EVDD of an organic light-emitting diode OLED of the display panel 110. Through such power-off processing by the defect management unit 1130, it is possible to prevent the panel burnt phenomenon on the display panel 110 proactively.

In an embodiment of the present invention, the defect detection unit 1110 and defect signal generation unit 1120 can be included in the timing controller 140 on the control printed circuit board C-PCB, as an example. The defect management unit 1130 can be located on the main printed circuit board M-PCB) and, in some cases, can be integrated into the internal components of the main controller M-CON on the main printed circuit board M-PCB.

Figure 12:
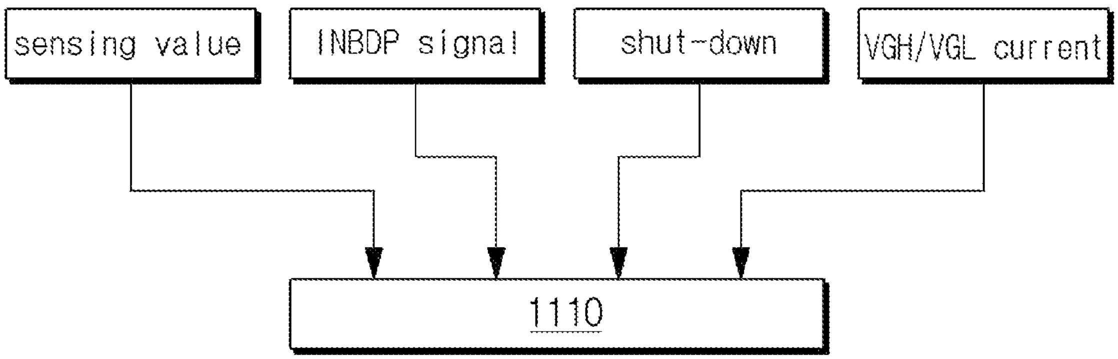
FIG. 12 is diagram illustrating a defect detection method in a panel burnt phenomenon prevention system of a display device according to an embodiment of the present invention.

FIG. 12 is a diagram illustrating a defect detection method in a panel burnt phenomenon prevention system of a display device 100 according to an embodiment of the present invention.

With reference to FIG. 12, the defect detection unit 1110 can detect various defects in the display panel 110 based on at least one of sensing values obtained during on-sensing, real-time sensing, or off-sensing of the display panel 110, voltage values (e.g., gate voltage such as VGH/VGL) in the display panel 110, current values (e.g., gate voltage current) in the display panel 110, information on the occurrence of protection operation such as a shutdown operation in the power controller 900, and an internal burnt detection signal (hereinafter referred to as INBDP or INBDP signal) received from the timing controller 140 and/or the display panel 110.

The defect detection unit 1110 can determine whether or not the sensing value obtained from on-sensing, real-time (RT) sensing, or off-sensing of the display panel 110 has fallen within a normal sensing value range and identify the occurrence of a defect if the sensing value has fallen outside the normal sensing value range.

Furthermore, the defect detection unit 1110 can compare the voltage value (e.g., gate voltage) or current value (e.g., gate voltage current) in the display panel 110 with a reference voltage value or reference current value and identify, when a difference thereof is detected, the occurrence of a defect on the corresponding signal line supplying the voltage or current or the location where the corresponding signal line is arranged.

Additionally, the defect detection unit 1110 can determine the occurrence of an open or short circuit defect based on the INBDP signal received from the timing controller 140 and/or the gate driver integrated circuit GDIC in the display panel 110. In an embodiment of the present invention, if the INBDP signal has a level below a predetermined normal range, the defect determination unit 1210 can determine that an open defect (e.g., an open circuit defect) has occurred. Conversely, if the INBDP signal has a level exceeding the predetermined normal range, the defect determination unit 1210 can determine that a short defect (e.g., a short circuit defect) has occurred.

In an embodiment of the present invention, the INBDP signal can be input to the defect detection unit 1110 when a line defect LD is detected based on sensing value acquired through real-time (RT) sensing, when a lock signal (e.g., low-level lock signal or low-level interface signal) is detected through an internal interface such as the EPI interface as described with reference to FIG. 8, when overcurrent occurs in the level shifter within a gate driver integrated circuit GDIC, or when cracks are detected at the edges of the display panel 110. These types of defects are shown in FIG. 13 which will be discussed more later.

Furthermore, the defect detection unit 1110 can determine the occurrence of a shutdown defect (e.g., shutdown operation defect) when a power protection operation (e.g., shutdown), performed by the power controller 900 or the gamma voltage generator due to various causes or other defects, is not performed properly or is repeated a predetermined number of times which can indicate a presence of a defect.

As described above, the defect detection unit 1110 can efficiently detect various types of defects that can occur at various timings and locations in the display device 100 by using various methods to identify potential defects in the display device 100.

Accordingly, the defect detection unit 1110 can then output corresponding BDP signals based on the detected defect types.

FIG. 13 is a diagram illustrating a matching relationship between defect types and BDP signals in a panel burnt phenomenon prevention system of a display device 100 according to an embodiment of the present invention. The defect defection unit 1110 can output one of BDP signals ("BDP" in the last column of the chart in FIG. 13) to the defect signal generation unit 1120 which in turn generates a defect signal DS corresponding to the received BDP signal.

With reference to FIGS. 11-13, the defect detection unit 1110 can output a $0^{th}$ BDP signal, a comparator BDP signal or no BDP signal when the detected defect is caused by the sensing value obtained from on-sensing, real-time (RT) sensing, or off-sensing of the display panel 110 falling outside the normal sensing value range, for example, when the EVSS voltage exceeds a predetermined level.

Furthermore, the defect detection unit 1110 can output one of first to fourth BDP signals VGH1 BDP, VGL1 BDP, VGL2 BDP, and VGLUD BDP, and an eighth BDP signal VGH2 BDP, when the detected defect is caused by the current corresponding to the gate voltages VGH and VGL used in the gate driver 130 exceeding the abnormal current (e.g., overcurrent protection OCP) level. For instance, when the overcurrent in the power management IC (PMIC) output (e.g., VGH, VGL) occurs, then the defect detection unit 1110 can output one of the BDP signals VGH1 BDP, VGL1 BDP, VGL2 BDP, VGLUD BDP, VGH2 BDP, etc.

More specifically, 24 or example, the defect detection unit 1110 can output the first BDP signal VGH1 BDP for the defect detected in association with the first high-potential gate voltage VGH1, the second BDP signal VGL1 BDP for the defect detected in association with the first low-potential gate voltage VGL1, the third BDP signal VGL2 BDP for the defect detected in association with the second low-potential gate voltage VGL2, the fourth BDP signal VGLUD BDP for the defect detected in association with the VGLUD voltage, and the eighth BDP signal VGH2 BDP for the defect detected in association with the second high-potential gate voltage VGH2.

When the defect is caused by a shutdown operation performed by the power controller 900 (e.g., PMIC shutdown) within the display device 100, the defect detection unit 1110 can output a fifth BDP signal (e.g., shutdown BDP).

When the defect is caused by an open circuit on signal lines, DL, GL, DVL, RVL, gate voltage wiring, etc., arranged in the display panel 110, the defect detection unit 1110 can output a sixth BDP signal INBDP (OPEN). For example, when a line defect (LD) is detected based on the sensing value obtained through real-time sensing (RT sensing), when a lock signal (e.g., low-level lock signal) is detected through an internal interface such as the EPI interface as described with reference to FIG. 8, when an overcurrent (e.g., OCP) occurs in the level shifter (L/S integrated circuit) within the gate driver IC GDIC or GIP (gate-in panel circuit), or when a crack detected at the edge of the display panel 110 results in wiring being open, the defect detection unit 1110 can determine the defect as an open circuit defect and output the sixth BDP signal INBDP (OPEN).

When the defect is caused by a short circuit in signal lines, DL, GL, DVL, RVL, gate voltage wiring, etc., the defect detection unit 1110 can output a seventh BDP signal INBDP (SHORT). For example, when a wiring short circuit occurs due to a crack at the edge (or another part) of the display panel 110, the defect detection unit 1110 can determine the occurrence of a short circuit defect and output the seventh BDP signal, INBDP (SHORT).

When the defect is caused by a shutdown operation performed by the power controller 900 or a gamma voltage generator located within the display device 100, the defect detection unit 1110 can output a ninth BDP signal P-Gamma BDP.

In summary, by determining the type of defect based on the detected cause and generating the corresponding BDP signals BDP, the defect management unit 1130 can identify the cause of the occurred defect from the BDP signals.

Figure 14:
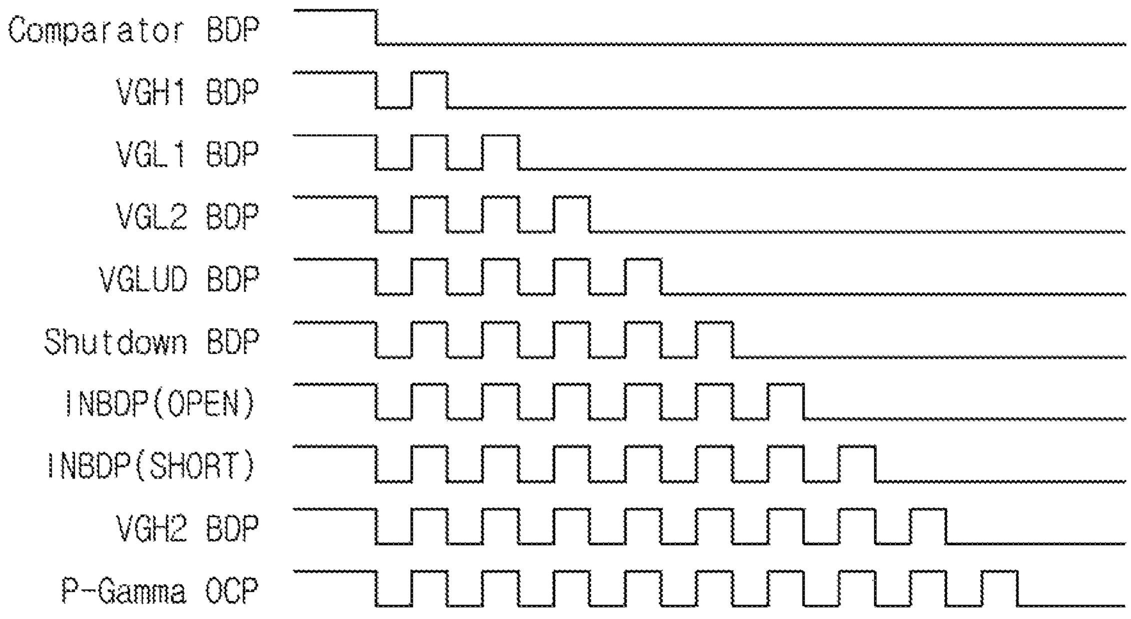
FIG. 14 is a diagram illustrating an example of defect signals corresponding to BDP signals in a panel burnt phenomenon prevention system of a display device according to an embodiment of the present invention.

FIG. 14 is a diagram illustrating an example of defect signals corresponding to BDP signals in a panel burnt phenomenon prevention system of a display device 100 according to an embodiment of the present invention.

With reference to FIG. 14, the defect signal generation unit 1120 can generate the defect signal DS with different pulse counts (e.g., rising edge count and high/low level interval count, etc.) based on the BDP received from the defect detection unit 1110. The defect management unit 1130 can then analyze the defect signal DS (e.g., count the pulse count of the defect signal DS, for example, by counting the number of rising edges and/or high/low level intervals), to recognize the defect type, and can use that analysis result to address the defect. The defect management unit 1130 can store and update all information associated with the defect signals DS, including the defect signals DS, the time of occurrence/reception/generation of the defect signals DS, what each type of defect signal DS represents (e.g., type of defect), etc., either internally or in the memory 1140. Such information can be referred to herein as 'defect-related information.' The defect management unit 1130 can also update such defect-related information for each defect signal, which then can be accessed and used by the defect management unit 1130, e.g., for comparison, analysis, or fixing the defects.

For example, the defect signal generation unit 1120 can output the defect signal DS corresponding to the first BDP signal VGH1 BDP with one pulse, the defect signal DS corresponding to the second BDP signal VGL1 BDP with two pulses, the defect signal DS corresponding to the third BDP signal VGL2 BDP with three pulses, and the defect signal DS corresponding to the fourth BDP signal VGLUD BDP with four pulses. The defect signal generation unit 1120 can output the defect signal DS corresponding to the fifth BDP signal Shutdown BDP with five pulses, the defect signal DS corresponding to the sixth BDP signal INBDP (OPEN) with six pulses, the defect signal DS corresponding to the seventh BDP signal INBDP (SHORT) with seven pulses, and the defect signal DS corresponding to the eighth BDP signal VGH2 BDP with eight pulses. The defect signal generation unit 1120 can also output the defect signal DS corresponding to the ninth BDP signal P-Gamma BDP with nine pulses. The defect signal generation unit 1120 can output the defect signal DS corresponding to a zero or no BDP (Comparator BDP) with no pulse.

In an embodiment of the present invention, the defect signal DS output from the defect signal generation unit 1120 can have an inverted phase compared to the aforementioned pulse signal. However, this embodiment of the present invention is not limited to this approach, and other variations such as different shaped pulse or waveform are possible.

Figure 15:
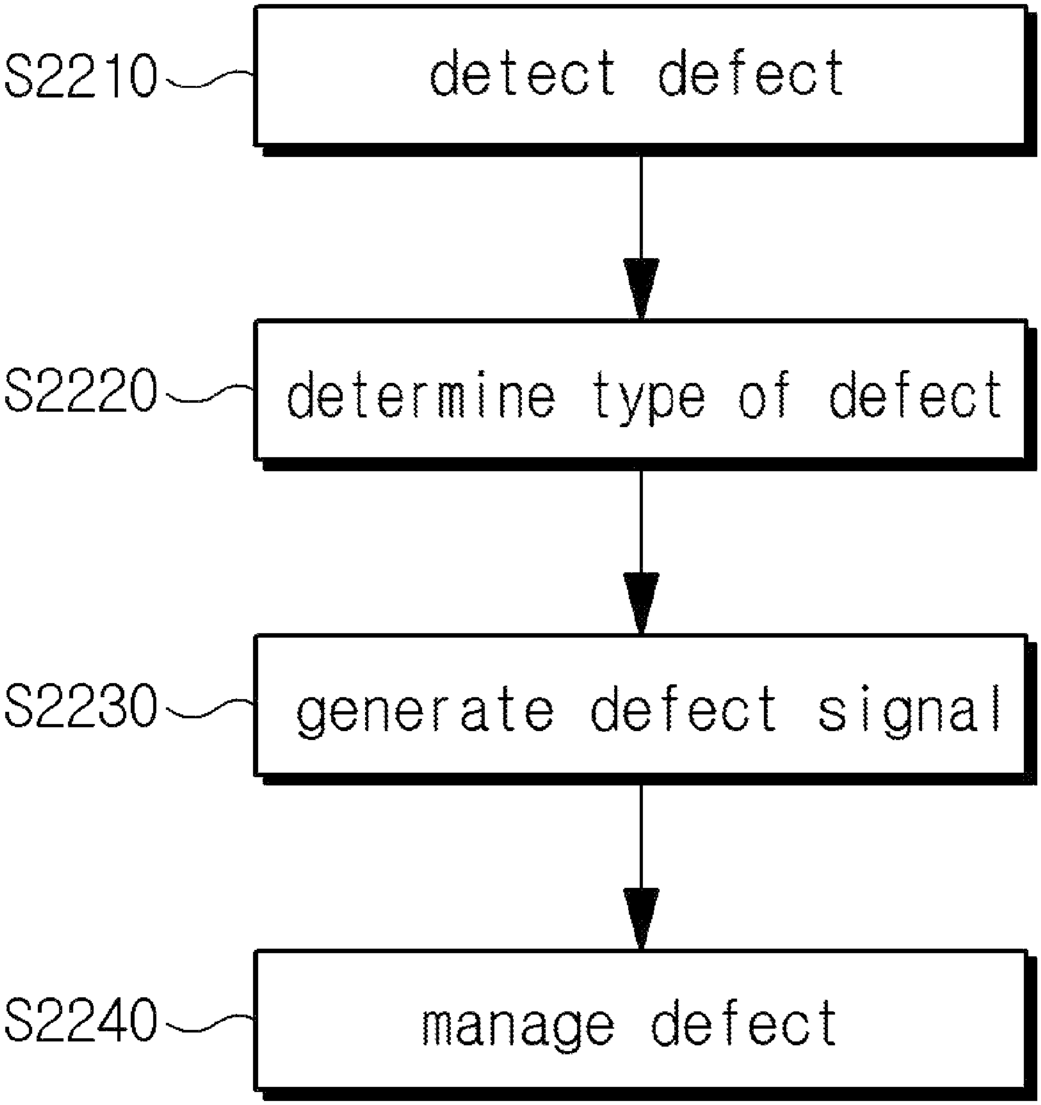
FIG. 15 is a flowchart illustrating a driving method of a display device according to an embodiment of the present invention.

FIG. 15 is a flowchart illustrating a driving method of a display device according to an embodiment of the present invention.

With reference to FIG. 15, the defect management method of a display device 100 according to an embodiment of the present invention can include detecting defects on the internal or external signal lines of the display panel 110 or detecting defects related to the malfunctioning of the display panel 110 at step S2210, outputting corresponding BDP signals BDP for the detected defects at step S2220, generating defect signals DS with different signal waveforms depending on the BDP signals BDP at step S2230, and analyzing the signal waveform of the defect signal DS to recognize the type of defect and storing the recognition result in the memory 1140 for management at step S2240.

The above-described defect management method is capable of identifying the cause of the detected defects in the display device 100 and facilitating the determination of the time and location of the occurrence of the defects. This allows for appropriate measures to be taken in response to the defects, according to the type of defect.

The display devices and driving methods thereof according to embodiments of the present invention are capable of preventing a panel burnt phenomenon by efficiently managing the detected defects after the defect detection.

The display devices and driving methods thereof according to embodiments of the present invention are capable of efficiently managing defects by determining the type of defect, generating a defect signal indicative of the occurrence of the type of defect depending on the type of defect determined, and transmitting the defect signal to the defect management unit so that the defect management unit or the user/administrator can address such defect.

The display devices and driving methods thereof according to embodiments of the present invention are capable of allowing for users, administrators, external devices, etc. to easily identify the occurrence timing and the types of defects, so such defects can be addressed efficiently.

Although embodiments of this invention have been described above with reference to the accompanying drawings, it will be understood that the technical configuration of this invention described above can be implemented in other specific forms by those skilled in the art without changing the technical concept or essential features of the present invention. Therefore, it should be understood that the embodiments described above are exemplary and not limited in all respects. Furthermore, the scope of the present invention is defined by the claims set forth below, rather than the detailed description above. In addition, it should be understood that all modifications or variations derived from the meaning and scope of the claims and their equivalent concept are included within the scope of this invention.

What is claimed is:

1. A display device comprising:

a display panel including a plurality of sub-pixels;

a data driver configured to apply a data signal to the plurality of sub-pixels;

a gate driver configured to apply a gate signal to the plurality of sub-pixels;

a timing controller configured to output control signals to the data driver and the gate driver; and a power controller configured to detect a defect associated with the display panel, and in response to detecting the defect, generate and output a defect signal having a different pulse count according to a type of the detected defect, wherein the timing controller stores defect-related information associated with the defect signal.

2. The display device of claim 1, further comprising:

a memory configured to store defect-related information associated with the defect signal, which is updated by the timing controller each time the defect signal is received.

3. The display device of claim 2, wherein the defect-related information stored in the memory comprises at least one of the pulse count of the defect signal, an occurrence timing of the defect signal, and the type of the defect.

4. The display device of claim 1, wherein the timing controller analyzes the defect signal and identifies the type of the detected defect based on a result of the analysis.

5. The display device of claim 4, wherein the timing controller includes a defect management unit configured to control the display panel to address the defect depending on the type of the defect identified based on the pulse count of the defect signal.

6. The display device of claim 1, wherein the power controller detects the defect based on at least one of a sensing value for the display panel, a current value measured in correspondence to a voltage value of the gate signal, shutdown information generated by the power controller, and an internal burnt detection signal input to the power controller.

7. The display device of claim 6, wherein the power controller comprises:

a detect detection unit configured to detect the defect and output a burnt detection signal that varies depending on the type of the detected defect; and a defect signal generation unit configured to generate and output the defect signal corresponding to the burnt detection signal.

8. The display device of claim 7, wherein the timing controller comprises:

a non-volatile storage medium, and a defect management unit configured to store on the defect-related information associated with the defect signal in the non-volatile storage medium.

9. The display device of claim 1, wherein the power controller outputs the defect signal to an external host system.

10. The display device of claim 1, wherein the power controller is further configured to output the defect signal to include pulses when the defect corresponds to a first type of defect and to output the defect signal to include no pulses when the defect corresponds to a second type of defect.

11. A display device comprising:

a display panel including a plurality of sub-pixels configured to display images;

at least one of a data driver and a gate driver configured to apply a data or gate signal to the plurality of sub-pixels;

a timing controller configured to output control signals to the at least one of the data driver and the gate driver; and a power controller configured to detect a defect associated with the display panel, and in response to detecting the defect, generate and output a defect signal having a different pulse count according to a type of the detected defect to the timing controller, wherein the timing controller analyzes the defect signal and recognizes the type of the detected defect based on a result of the analysis.

12. The display device of claim 11, wherein the power controller generates the defect signal each time a certain defect or abnormality associated with the display panel occurs, so as to output a plurality of defect signals, and wherein the plurality of defect signals have different pulse counts depending on types of defects.

13. The display device of claim 11, further comprising:

a memory configured to store defect-related information associated with the plurality of defect signals.

14. The display device of claim 11, wherein the power controller is further configured to:

output a burnt detection signal that varies depending on the type of the detected defect, and generate and output the defect signal having the different pulse count according to the burnt detection signal.

15. The display device of claim 13, wherein the defect-related information stored in the memory comprises at least one of the pulse count of the defect signal or an occurrence timing of the defect signal.

16. A method for checking a display device including a display panel having a plurality of sub-pixels, a data driver to apply a data signal to the plurality of sub-pixels, a gate driver to apply a gate signal to the plurality of sub-pixels, a power controller to apply a driving voltage to the display panel, and a timing controller to control operations of the data driver and the gate driver, the method comprising:

detecting, by the power controller, a defect associated with the display panel;

in response to detecting the defect, generating and outputting, by the power controller, a defect signal having a different pulse count according to a type of the detected defect; and storing, by the timing controller, defect-related information associated with the defect signal in a memory.

17. The method of claim 16, wherein the defect-related information stored in the memory comprises at least one of the pulse count of the defect signal, an occurrence timing of the defect signal, and the type of the defect.

18. The method of claim 17, further comprising identifying, by the timing controller, the type of the defect based on the pulse count of the defect signal.

19. The method of claim 16, wherein the detecting of the defect comprises:

detecting the defect based on at least one of a sensing value for the display panel, a current value measured in correspondence to a voltage value of the gate signal, shutdown information generated by the power controller, and an internal burnt detection signal input to the power controller.

20. The method of claim 16, further comprising outputting, by the power controller, the defect signal to an external host system.

* * * * *